Nov. 2, 1965   M. E. LACKEY   3,215,607
MULTI-REGION NEUTRONIC FUEL ELEMENT
Filed Feb. 7, 1964

INVENTOR.
Mack E. Lackey
BY
Roland G. Anderson
ATTORNEY.

United States Patent Office 3,215,607
Patented Nov. 2, 1965

3,215,607
MULTI-REGION NEUTRONIC FUEL ELEMENT
Mack E. Lackey, Oak Ridge, Tenn., assignor to the United States of America as represented by the United States Atomic Energy Commission
Filed Feb. 7, 1964, Ser. No. 343,424
6 Claims. (Cl. 176—67)

This invention relates generally to neutronic reactor fuel elements and more specifically to neutronic reactor fuel elements having internal temperatures substantially lower than those found in conventional fuel elements.

Characteristic of the neutronic reactor art, especially that portion of the art which relates to power reactors, has been the problem of providing high temperature reactor operation while maintaining fuel element integrity therein. High temperature operation is necessary in order to provide an economically competitive thermodynamic efficiency in power reactors.

Uranium metal and other metals which are otherwise satisfactory for fabricating fuel elements, generally have relatively low melting points or other undesirable physical characteristics which limit their high temperature use. In an attempt to provide fuel elements which can operate at higher temperatures than possible with metal elements, high temperature ceramic materials have been utilized. High temperature ceramics, however, are generally characterized by low thermal conductivities, susceptibility to thermal stress and relatively low tensile strengths. Because of the low tensile strength of ceramic materials, ceramic fuel elements must be fabricated in thick sections. Temperature peaking occurs in thick ceramic fuel element sections due to the internal heat generation therein coupled with the low thermal conductivities which are characteristic of ceramic materials. The temperature peaking can amount to several thousand degrees F. difference between the surface and centerline temperatures of the fuel element. Such temperature peaking is highly undesirable because it creates large thermal stresses in the ceramic fuel and also because it limits the surface temperature at which the fuel element can be safely operated. As the maximum temperature found within the fuel element is the limiting factor in determining the power level at which the fuel element can operate, the centerline temperatures of the fuel element in a reactor may effectively determine the power level of the entire reactor system. The thermal efficiency of a reactor system is largely dependent on the temperature imparted from the fuel elements to the system working fluid which, in turn, is highly dependent upon the fuel element surface temperature. It follows that the effect of temperature peaking in ceramic fuel elements is to lower the output and thermal efficiency of the entire reactor system. Another deleterious effect which occurs as a result of temperature peaking in neutronic reactor fuel elements is the greatly increased thermal expansion along the axis of the fuel at which the peaking occurs. Space must be provided, at the ends of the tubes which enclose the fuel pellets, to accommodate this expansion. Undesirable ratcheting occurs between the fuel and tubes as the fuel temperature is raised and lowered in response to changes in power of the reactor system.

Attempts have been made to reduce the temperature peaking problem in ceramic elements by providing hollow fuel elements. Although partial success has been thus realized, this method of reducing temperature peaking is limited by difficulties in fabricating thin walled ceramic elements and also by a lower limit on the fuel element wall thickness, below which fuel element integrity cannot be maintained due to the inherent weakness of ceramic materials in tension and their susceptibility to failure under shock loadings.

Structural supports in the form of cladding and internal rods, for example, have been used to support thin annular elements which are incapable of self support. This method also has met only partial sucess due to the difficulty of providing structural materials having thermal expansion coefficients which match those of the ceramic fuel materials. Differing thermal expansion coefficients cause stresses to develop in the fuel and structural material with temperature changes and they also cause gaps to develop between the fuel and structural material which are highly resistant to heat transfer.

It is, accordingly, a general object of the invention to provide a fuel element for a neutronic reactor in which temperature peaking is minimized.

A further object of the invention is to provide a fuel element having lower internal temperatures for any given power output by the element.

A still further object of the invention is to provide a fuel element having a fuel region and a fuel support region which are metallurgically bonded.

Another object of the invention is to provide a fuel element having a fuel region and a fuel support region which have similar chemical, thermal and physical characteristics while differing in nuclear characteristics.

Another object of the invention is to provide a fuel element in which greater production of fissile from fertile material is possible.

Still another object of the invention is to provide a fuel element in which materials having lower values of thermal conductivity can be used than heretofore considered practicable.

Other objects of the invention will become apparent from an examination of the following description of the invention and appended drawings wherein.

Figure 3:
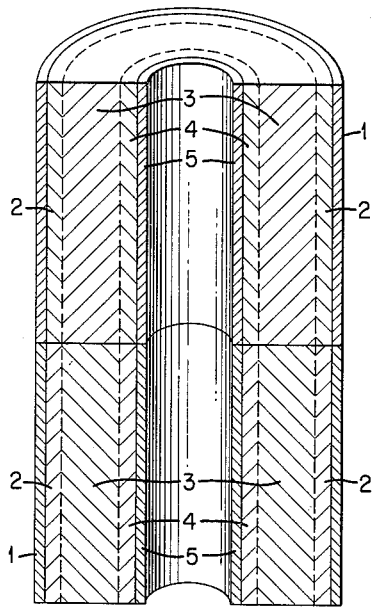

FIG. 3 as a transverse sectional view of a hollow cylindrical fuel element with enriched fuel disposed about its inner and outer radii in accordance with the present invention.

Figure 4:
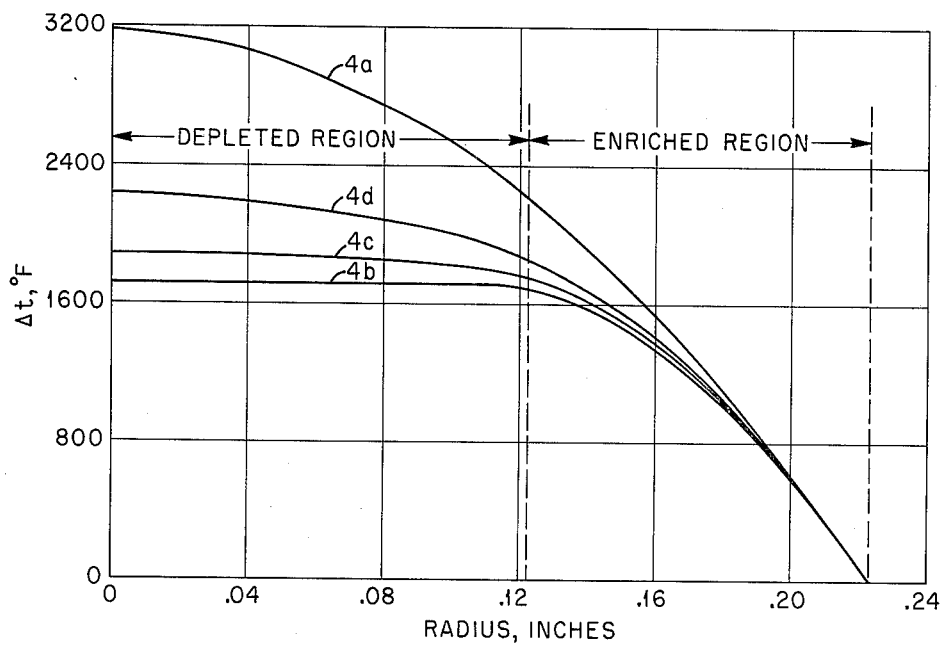

FIG. 4 is a graph comparing temperature distributions across solid cylindrical fuel elements constructed according to the present invention and according to the prior art teaching.

Figure 5:
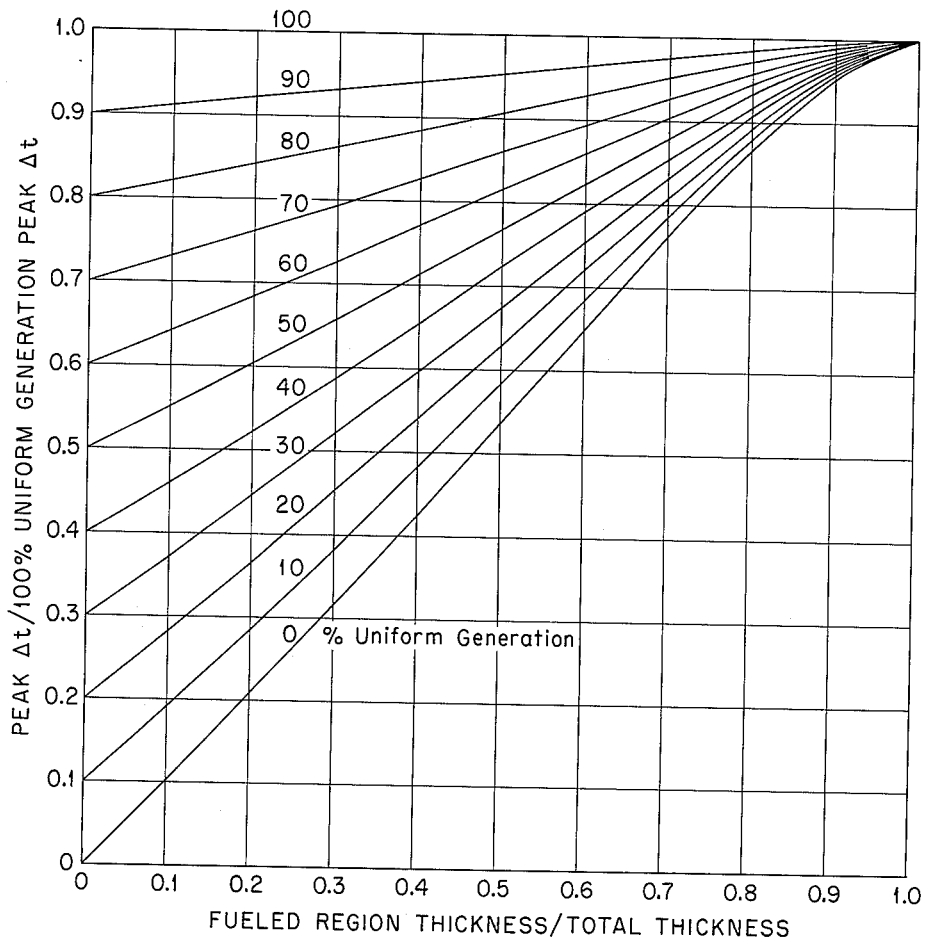

FIG. 5 illustrates the relative peak temperature increases of multi-region fuel elements as a function of the amount of segregation of the enriched and depleted fuel and the fraction of the total heat that is generated uniformly in the total element.

In accordance with the present invention, a fuel element for a neutronic reactor is provided which comprises a jacket of non-fissionable material surrounding a uranium bearing core having uniform chemical, physical and thermal properties throughout. The nuclear properties of the core region vary, however, in that the fissionable uranium-235 isotope is in greater abundance in the core region adjacent to the jacket than throughout the remainder of the uranium bearing core. Even though the abundance of uranium-235 isotope varies throughout the entire core region, the total uranium concentration, which includes the uranium-235 and uranium-238 isotopes, is uniform. Since the uranium-235 and uranium-238 isotopes are chemically the same, the chemical composition of the core region depends only on the total uranium concentration which in this case is uniform throughout the core region. It follows therefore, that the chemical composition of the core region is also uniform.

Fuel elements made in accordance with the invention may comprise fuel materials such as uranium metal, $UO_2$, $U_3O_8$, $UC$, $UC_2$, $U_2C_3$, $UN$, $USi$, or $U_3Si$; with $UO_2$ being of primary interest because of the intensive investigation which it has received and its extensive use in neutronic reactors. Other uranium containing materials which satisfy normal fuel element requirements can also be used. Cladding materials may be selected, for fuel elements constructed according to this invention, in the same manner as they are selected for use in conventional fuel elements.

It is noted that while this invention may be applied to metallic fuel elements, it is primarily directed to ceramic fuel elements adapted for high temperature operation. Ceramic fuel elements are also of special interest because they require structural support when fabricated in thin sections and are especially subject to temperature peaking due to their relatively low thermal conductivities and thick fuel sections as compared to metallic and dispersion type fuel elements.

$UO_2$ pellets, which may constitute the core portion of a neutronic fuel element, fragment by radial cracking from excessive thermal stressing rather than due to radiation induced mechanical property changes. The thermal stresses arise primarily because of the temperature gradients across the pellets caused by heat generation occurring throughout the element and the low thermal conductivity of the $UO_2$; rather than as a result of the absolute temperature therein. The subject invention, in reducing the temperature peaking in a fuel pellet, therefore has a secondary beneficial effect: that of reducing the temperature gradient induced stresses in a fuel element. Another benefit of reduced temperature peaking occurs when thermal expansion along the fuel element axis is reduced. The fuel elements can then be made with little or no expansion space left at the ends of the cladding tubes. In the superheater region of the BONUS Reactor and in the Experimental Gas Cooled Reactor, depression in the fuel pellet ends were necessary in order to accommodate this expansion.

Figure 2:
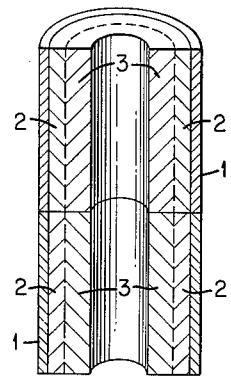
FIG. 2 is a transverse sectional view of a hollow cylindrical fuel element with enriched fuel disposed about its outer radius in accordance with the present invention.
Figure 1:
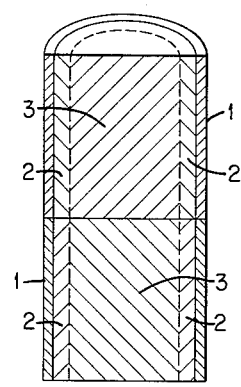
FIG. 1 is a transverse sectional view of a solid cylindrical fuel element made in accordance with the present invention.

To facilitate an understanding of the invention, reference is made to FIGS. 1–3 wherein several preferred embodiments of the invention are illustrated. In FIG. 1 a portion of a solid right cylindrical uranium oxide fuel element or rod which would be suitable for use in the boiler core region of the BONUS Reactor located at Point Higuera, Puerto Rico, is shown in transverse section. The complete fuel rod as used in the boiler region of the BONUS Reactor has an active length of 54 inches and comprises two rod segments, each of which has an active length of 27 inches. FIG. 1 is also typical of a fuel element suitable for any tube and pellet type reactor fuel element although the enrichments, dimensions, and cladding material may vary between reactors. A Zircaloy-2 cladding 1 surrounds a uranium oxide core section having an outer enriched region 2 and an inner depleted region 3. The outer enriched region 2 is 100 mils thick and contains uranium enriched to 3.14 percent in the uranium-235 isotope. The depleted region 2, which comprises the remainder of the core section, has a diameter of 0.245 inch and contains uranium which is depleted in the uranium-235 isotope to an enrichment of 0.2 percent.

The term "depleted" as used herein refers to uranium or a region containing uranium of lower isotopic enrichment in the fissionable uranium-235 isotope than that of the uranium found in the enriched region. The term includes, but is not restricted to, uranium having less than a natural abundance of the uranium-235 isotope.

FIG. 2 illustrates, in transverse section, a portion of a hollow right cylindrical uranium oxide fuel element which is suitable for use in the Experimental Gas Cooled Reactor located at Oak Ridge, Tennessee. A stainless steel cladding 1 surrounds an outer enriched region 2 of the uranium oxide core section. A hollow, annular depleted region 3 is used in the embodiment of FIG. 2 to further reduce temperature peaking in the center of the fuel core due to fissioning of plutonium which is produced therein from the uranium-235 isotope during reactor operation and also due to fissioning of the uranium-235 isotope remaining in the depleted region. The central hollow portion also acts as an expansion volume for the collection and retention of gaseous fission products which escape from the fuel thereby preventing excessive gaseous fission product pressure build-up within the fuel elements. In the Experimental Gas Cooled Reactor each of the fuel elements contains 36 hollow uranium oxide fuel pellets, each 0.707 inch outside diameter by 0.323 inch inside diameter by 0.750 inch long.

The fuel element of FIG. 3 differs from that of FIG. 2 in that a second enriched fuel region 4 and a second cladding 5 is provided along the internal surface of the annular depleted region 3. The internal cladding 5 and fuel region 4 permit an increase in the allowable heat generation for a given size fuel element. The fuel element of FIG. 3 would normally be of larger diameter than the element of FIG. 2 in order to provide a substantial internal heat generation area and coolant flow passageway. Coolants having good moderating properties would be desirable for cooling the internal surface of this embodiment so as to provide a substantial thermal neutron flux therein.

FIG. 4 provides a graphic illustration, by means of temperature profiles for a solid cylindrical fuel element, of the advantages provided by the subject invention. The abscissa of FIG. 4 represents the radial distance from the centerline of the fuel elements whose temperature profiles are illustrated. The ordinate of FIG. 4 represents the increase in temperature, at various radial positions within the fuel element, over the temperature at the fuel surface. Curve 4a shows the temperature profile of a solid 0.445 inch diameter right-cylindrical $UO_2$ fuel element with a uniform fissonable fuel dispersion throughout which is operating at 48,000 B.t.u./hr.ft. In the absence of a detailed physics study, a uniform thermal neutron flux and corresponding 100 percent uniform power generation throughout the fuel element is assumed. Fuel elements of this type, containing $UO_2$ enriched to 2.4 percent in the fissionable uranium-235 isotope, are used in the first core loading of the BONUS Reactor located at Point Higuera, Puerto Rico. As can be seen from curve 4a the centerline temperature is about 3200 degrees F. higher than the surface temperature of the fuel element. This large centerline temperature peak limits the power generation within the BONUS Reactor.

Curve 4b represents a fuel element having the same diameter as the fuel element of curve 4a in which the outer 100 mils of the fuel element periphery contains $UO_2$ enriched in the uranium-235 isotope to 3.44 percent, and wherein the remaining central portion of the fuel element is assumed to contain $UO_2$ in which there is no uranium-235 isotope. The completely depleted central portion is, of course, an ideal situation which can only be approached through the use of low enrichment tails from the gaseous diffusion plants or through the use of reprocessed depleted fuel. It is noted that curve 4b represents the fuel element temperature profile at the beginning of operation before any fissionable plutonium is generated from the uranium-238 isotope within the central depleted region. During reactor operation the temperature of the central depleted region will tend to increase as plutonium is generated and begins fissioning.

Curves 4c and 4d show the effect on the temperature profile of providing various central depleted region enrichments. The fuel element of curve 4c has a geometry similar to that of curve 4b but differs in that its central depleted region contains $UO_2$ enriched in the uranium-235 isotope to 0.2 percent while its outer 100 mils contains $UO_2$ enriched in the uranium-235 isotope to 3.14 percent. The fuel element of curve 4d has a central depleted region which contains $UO_2$ enriched in the uranium-235 isotope to 0.71 percent and an outer enriched region containing $UO_2$ enriched in the uranium-235 isotope to 2.44 percent. Curves 4c and 4d indicate centerline temperatures approximately 1300 degrees F. and 900 degrees F. lower, respectively, than the centerline temperature of the prior art fuel element of curve 4a.

Inasmuch as the fuel elements represented by curves 4a, 4b, 4c and 4d all provide the same power and are calculated to contain the same total uranium-235 isotope content, the effect of applicant's invention on fuel element internal temperatures is apparent. Curves 4a and 4b define an envelope within which fuel elements constructed according to applicant's invention will operate assuming the same power level and geometry in the elements. Higher internal enrichments and thicker enriched regions will create higher internal temperatures as pointed out above. A different set of curves will result, of course, for each geometry and power level which the designer may wish to select. In all cases, however, the benefits illustrated in the curves of FIG. 4 will result in fuel elements constructed according to applicant's invention.

In some reactors, such as the Experimental Gas Cooled Reactor located at Oak Ridge, Tennessee, the limiting factor in fuel element lifetime is the allowable gaseous fission product pressure which increases with increased fuel element burnup. The gaseous fission products in the Experimental Gas Cooled Reactor accumulate in the hollow central cavities of the annular fuel pellets. Inasmuch as the pressure exerted by the gaseous fission products depends in part upon their temperature, fuel elements operating at the same power but constructed according to the present invention, as in the embodiment of FIG. 2, will extend the fuel element lifetime by operating at lower central temperatures with correspondingly lower gaseous fission product pressures.

FIG. 5 shows the relative peak temperature increases of multi-region fuel elements as a function of the degree in which the fissionable isotope is segregated in the fuel element and the percentage of total power which is generated uniformly throughout the fuel element. The abscissa of FIG. 5 represents the ratio of the thickness of the enriched region to the total fuel element total thickness, and the ordinate represents the ratio of the centerline or peak fuel element temperature to the centerline temperature of a fuel uniform with 100 percent uniform power generation. The amount of uniform power generation throughout the fuel element is largely determined by the abundance of fissionable isotopes originally provided in the depleted or less enriched region and the amount of fissile material present which has been converted from fertile material. Another factor is the amount of thermal neutron shielding provided by the enriched isotope which surrounds the less enriched region containing fertile material. This last factor is especially important in production type reactors in which the primary consideration is the production of plutonium from the uranium-238 isotope. The high-thermal-cross-section uranium-235 isotope tends to create a thermal flux depression and a fast flux peaking in the fuel element central core portion. Such an environment is particularly conducive to the production of plutonium from the uranium-238 isotope as fast neutrons are necessary for such production and the partial exclusion of slow neutrons from the central region reduces the production of undesirable plutonium-240 and minimizes fission reactions in the high thermal-cross-section plutonium isotope.

It is thus apparent that the subject invention provides the benefits of both thermal and fast reactor systems in production reactors and is accordingly of special benefit therein. Inasmuch as the enriched region of each fuel element operates on thermal neutrons, the advantages of a thermal reactor with regard to control and neutron leakage problems is realized, while the central less-enriched portions of the fuel elements where plutonium production is taking place see primarily fast neutrons which are produced in the immediately adjacent enriched region, so that plutonium production takes place in what amounts to a highly advantageous fast neutron environment where breeding reactions between U-238 and fast neutrons are maximized and fission reactions between plutonium and thermal neutrons are minimized.

It is noted from FIG. 5 that temperature peaking is minimized with decreasing values of the ratio of enriched to total fuel element thicknesses and for decreasing values of uniform power generation. The percentage of uniform power generation also decreases as the difference in enrichment values between the enriched and depleted region is increased. The integrally bonded, multi-region fuel element provides a high degree of flexibility in the design of either a high power or low central temperature fuel element. The concept can be applied to elements cooled on either one or both sides and to various shapes such as flat plates, hollow cylinders, or solid rods. The subject concept will allow design flexibility in the axial placement of the fuel within a reactor core by changing the enrichment of the fuel or by simply varying the thickness of the fueled region of the segregated elements as a function of their axial location.

The multi-region element concept can be applied to both thermal and fast reactor types and to various combinations of fertile and fissionable uranium compound fuels that are adaptable to various methods of fabrication such as co-extrusion, co-pressing, centrifugal slip casting and vapor deposition. The fabrication method for a particular element varies as a function of its peculiar design requirement.

In using the co-pressing method to fabricate the fuel element embodiment of FIG. 1, for example, an annular bushing of material enriched in the fissionable uranium-235 isotope is first pressed. A solid pellet comprising material having a lower enrichment in the fissionable isotope than the enriched annular bushing is then pressed into the center of the annular bushing to form a solid, multi-region, cylindrical fuel pellet. The multi-region pellet is then sintered to provide a metallurgical bond between the regions of higher and lower uranium-235 enrichment. The metallurgical bond provides a uniform support and decreases the thermal resistance between the regions.

The fuel element of FIG. 1 may also be co-extruded using a dual head die so that both the higher and lower enriched components may be extruded simultaneously. After being extruded, the fuel element is sintered to provide metallurgical bonding between the regions of higher and lower enrichment.

A third method which may be used to fabricate the embodiment of FIG. 1 is centrifugal slip casting. A slurry containing material enriched in the fissionable isotope is run into a rotating tube. The enriched material is deposited in an annular zone along the inside wall of the tube and the liquid component of the enriched slurry is drawn off through the tube center. The hollow center of the tube is then filled with material having a lower enrichment and the tube is baked to remove the remaining liquid. After drying, the material is vibratory compacted. No sintering is necessary as a metallurgical bond will develop in the reactor at the high temperatures which occur during reactor operation.

Other methods of fabrication such as vapor deposition will be apparent to those skilled in the metallurgy art. Also, any variations in the described fabrication methods that are necessary to fabricate other embodiments than the embodiment of FIG. 1 will be apparent.

An infinite variety of arrangements are possible in fuel elements constructed according to the present invention. The embodiment of FIG. 1, for example, may be made with its enriched region having a thickness which varies from several mils to an inch or more with variations in its depleted region also. The enrichment values of the higher and lower enriched regions may also vary with the higher enrichment region varying from about 1 percent to greater than 90 percent. The region of lower enrichment may have any enrichment value less than the enrichment of the higher enriched region and still provide some of the benefits of the present invention. The lowermost value of enrichment possible in this region is determined by the enrichment of the tails from the various gaseous diffusion plants and the depleted values which may be found in depleted uranium taken from fuel which has been irradiated in a reactor environment. Fuel elements which receive the maximum benefits of this invention, however, are those which utilize the thinnest enriched fuel regions and central depleted regions having the lowest possible enrichment. Fuel elements of this type are characterized by minimum internal heat generation rates due to the minimum amount of fissionable isotopes contained therein, and a maximum heat transfer efficiency due to the generation of heat in a zone as close as possible to fuel element cooling surfaces.

The above description of several embodiments of the invention was offered for illustrative purposes only and should not be interpreted in a limiting sense. It is intended that the invention be limited only by the claims appended hereto.

Having thus described my invention, I claim:

1. A fuel element for a neutronic reactor comprising a jacket of nonfissionable material, a uranium bearing core portion disposed within said jacket, said core portion having inner and outer regions, said outer region containing uranium enriched in the uranium-235 isotope to a value greater than that of natural uranium, said inner region containing uranium having a uranium-235 isotopic abundance less than that of said outer region, and said inner and outer regions having identical chemical compositions.

2. The fuel element of claim 1 wherein said inner region is metallurgically bonded to said outer region.

3. A fuel element for a neutronic reactor comprising a jacket of nonfissionable material, a uranium bearing core portion disposed within said jacket, said core portion having inner and outer regions, said outer region containing uranium enriched in the uranium-235 isotope to a value greater than that of natural uranium, said inner region containing uranium depleted in the uranium-235 isotope to a value less than that of natural uranium, and said inner and outer regions having identical chemical compositions.

4. A fuel element for a neutronic reactor comprising a jacket of nonfissionable material, a core portion disposed within said jacket, said core portion having inner and outer regions, said outer region comprising a first uranium compound containing uranium enriched in the uranium-235 isotope to a value greater than that of natural uranium, said inner region comprising a second uranium compound of identical chemical composition with said first uranium compound of said outer region, said second uranium compound containing uranium having a uranium-235 isotopic abundance less than that of said first uranium compound.

5. A fuel element for a neutronic reactor comprising a jacket of nonfissionable material, a core portion disposed within said jacket, said core portion having inner and outer regions, said outer region comprising uranium dioxide containing uranium enriched in the uranium-235 isotope to a value greater than that of natural uranium, said inner region comprising uranium dioxide containing uranium with a uranium-235 isotopic abundance no greater than that of natural uranium.

6. A fuel element for a neutronic reactor comprising a hollow cylindrical jacket of nonfissionable material, a solid right cylindrical core portion disposed within said jacket, said core portion having a solid right cylindrical inner region and an annular outer region, said outer region comprising a first uranium compound containing uranium enriched in the uranium-235 isotope to a value greater than that of natural uranium, said inner region comprising a second uranium compound of identical chemical composition with said first uranium compound of said outer region, said second uranium compound containing uranium having an isotopic abundance of uranium-235 which is less than that of said first uranium compound, and said inner region being metallurgically bonded to said outer region.

References Cited by the Examiner

UNITED STATES PATENTS

| | | | |
|---|---|---|---|
| 2,990,351 | 6/61 | Sanz et al. | 176—82 |
| 3,098,809 | 7/63 | Huet | 176—90 |

FOREIGN PATENTS

| | | | |
|---|---|---|---|
| 1,278,598 | 10/61 | France | 176—69 |

CARL D. QUARFORTH, *Primary Examiner.*

L. DEWAYNE RUTLEDGE, *Examiner.*